United States Patent
Sachs et al.

(10) Patent No.: US 7,586,480 B2
(45) Date of Patent: Sep. 8, 2009

(54) HYBRID POINTING DEVICE

(75) Inventors: Todd Stephen Sachs, Palo Alto, CA (US); Jonah Alexander Harley, Mountain View, CA (US); James N. Hollenhorst, Saratoga, CA (US); Farid Matta, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 604 days.

(21) Appl. No.: 11/069,341

(22) Filed: Feb. 28, 2005

(65) Prior Publication Data

US 2006/0192754 A1 Aug. 31, 2006

(51) Int. Cl.
*G06F 3/033* (2006.01)
(52) U.S. Cl. .................. 345/157; 345/156; 345/173
(58) Field of Classification Search ......... 345/156–158, 345/161–168, 173
See application file for complete search history.

(56) References Cited

U.S. PATENT DOCUMENTS

| | | | |
|---|---|---|---|
| 3,987,685 A | 10/1976 | Opocensky | |
| 4,670,743 A | 6/1987 | Zemke | |
| 4,719,455 A | 1/1988 | Louis | |
| 5,056,146 A | 10/1991 | Nishide | |
| 5,086,296 A | 2/1992 | Clark | |
| 5,252,952 A | 10/1993 | Frank et al. | |
| 5,263,134 A | 11/1993 | Paal | |
| 5,504,502 A * | 4/1996 | Arita et al. | 345/160 |
| 5,515,044 A * | 5/1996 | Glatt | 341/22 |
| 5,615,083 A | 3/1997 | Barnett | |
| 5,659,334 A | 8/1997 | Yaniger | |
| 5,703,356 A | 12/1997 | Bidiville et al. | |
| 5,704,037 A | 12/1997 | Chen | |
| 5,739,821 A | 4/1998 | Ho et al. | |
| 5,808,603 A | 9/1998 | Chen | |

(Continued)

FOREIGN PATENT DOCUMENTS

DE 4033465 5/1991

(Continued)

OTHER PUBLICATIONS

Search Report for Great Britain related to patent application No. GB 0601080.5 dated Mar. 24, 2006.

(Continued)

*Primary Examiner*—Richard Hjerpe
*Assistant Examiner*—Kimnhung Nguyen (57) ABSTRACT

An input device having a movable puck and display screen is disclosed. The puck is confined to move on a puck surface having a puck field of motion defined thereon. The puck field of motion is divided into a pointing region and a function region. A controller determines a position for the puck within the field of motion. The display screen displays a two-dimensional scene and a cursor that moves within the scene in a manner controlled by the position of the puck when the puck is in the pointing region. The controller causes the scene to change when the puck is in the function region. A deformable barrier that inhibits the movement of the puck into the function region can be used to prevent inadvertent changing of the display scene. The inhibition is overcome by a user applying additional force to the puck in a direction parallel to the surface.

18 Claims, 5 Drawing Sheets

U.S. PATENT DOCUMENTS

| | | | |
|---|---|---|---|
| 5,815,139 | A | 9/1998 | Yoshikawa et al. |
| 5,874,956 | A | 2/1999 | LaHood |
| 5,883,690 | A | 3/1999 | Meyers et al. |
| 5,889,507 | A | 3/1999 | Engle et al. |
| 5,914,465 | A | 6/1999 | Allen |
| 5,956,016 | A | 9/1999 | Kuenzner et al. |
| 6,115,030 | A | 9/2000 | Berstin et al. |
| 6,198,473 | B1 | 3/2001 | Armstrong |
| 6,256,012 | B1 | 7/2001 | Devolpi |
| 6,288,707 | B1 | 9/2001 | Philipp |
| 6,292,174 | B1 | 9/2001 | Mallett et al. |
| 6,326,948 | B1 | 12/2001 | Kobachi et al. |
| 6,430,023 | B1 | 8/2002 | Suzuki |
| 6,492,911 | B1 | 12/2002 | Netzer |
| 6,525,713 | B1 | 2/2003 | Soeta et al. |
| 6,667,733 | B2 | 12/2003 | Miyoshi |
| 6,753,848 | B2 | 6/2004 | Toshiharu |
| 6,762,748 | B2 | 7/2004 | Maatta et al. |
| 6,816,148 | B2 * | 11/2004 | Mallett et al. ............... 345/157 |
| 6,816,154 | B2 | 11/2004 | Wong et al. |
| 6,961,052 | B1 | 11/2005 | Vaziri |
| 7,042,441 | B2 | 5/2006 | Adams et al. |
| 7,046,230 | B2 | 5/2006 | Zadesky et al. |
| 7,123,028 | B2 | 10/2006 | Okada et al. |
| 7,158,115 | B2 | 1/2007 | Harley et al. |
| 2002/0163547 | A1 * | 11/2002 | Abramson et al. .......... 345/855 |
| 2003/0048262 | A1 | 3/2003 | Wu et al. |
| 2003/0076301 | A1 | 4/2003 | Tsuk et al. |
| 2003/0095096 | A1 | 5/2003 | Robbin et al. |
| 2004/0108993 | A1 | 6/2004 | Suzuki et al. |
| 2005/0052425 | A1 | 3/2005 | Zadesky et al. |
| 2005/0052426 | A1 | 3/2005 | Hagermoser et al. |
| 2005/0052429 | A1 | 3/2005 | Philipp |
| 2005/0062732 | A1 | 3/2005 | Sinclair et al. |
| 2005/0110755 | A1 | 5/2005 | Harley et al. |
| 2006/0001657 | A1 | 1/2006 | Monney et al. |
| 2006/0033721 | A1 * | 2/2006 | Woolley et al. .............. 345/173 |
| 2006/0038783 | A1 | 2/2006 | Shaw et al. |
| 2006/0176270 | A1 | 8/2006 | Sachs |
| 2006/0192754 | A1 | 8/2006 | Sachs et al. |
| 2006/0267933 | A1 | 11/2006 | Tai et al. |
| 2007/0052691 | A1 | 3/2007 | Zadesky et al. |
| 2007/0247421 | A1 | 10/2007 | Orsley |

FOREIGN PATENT DOCUMENTS

| | | |
|---|---|---|
| DE | 19710686 | 9/1998 |
| DE | 10309011 | 9/2004 |
| EP | 1136939 | 9/2001 |
| GB | 2 247 938 A | 3/1992 |
| WO | WO-00/51358 | 8/2000 |
| WO | WO-02/03317 | 1/2002 |
| WO | WO-2006/031332 | 3/2006 |

OTHER PUBLICATIONS

U.S. Appl. No. 10/723,957, filed Nov. 24, 2003, Harley.
U.S. Appl. No. 11/407,274, filed Apr. 19, 2006, Orsley.
U.S. Appl. No. 11/606,556, filed Nov. 30, 2007, Harley et al.
U.S. Appl. No. 11/923,653, filed Oct. 25, 2007, Orsley.
U.S. Appl. No. 60/794,723, filed Apr. 25, 2006, Harley.
"3M Double Coated tapes", *9731 931 RW Technical Data* Feb. 2005.
"ARS Technica, iPod nano", http://arstechnica.com/reviews/ardware/nano.ars/4, 1998.
"Motorola SLVR", www.motorola.com/motoinfo/product/details.jsp 2007.
Avago Technologies "AMRI-2000 Data Sheet", 2005.
Avago Technologies "AMRI-2000-P000 Data Sheet", Sep. 25, 2007.
Panasonic, "Panasonic Tactile Sheet Type ESP", Dec. 2005.

* cited by examiner

HYBRID POINTING DEVICE

BACKGROUND OF THE INVENTION

Modern computer operating systems and graphics programs require a pointing device for controlling the position of a cursor on the computer display. Likewise, handheld devices such as personal information managers and cell phones would also benefit from the inclusion of such a pointing device. For desktop PCs, the most successful pointing device is the "mouse". A mouse is a hand held object that is moved over a flat surface near the keyboard to control the motion of a cursor on the computer display. The direction and distance over which the mouse is moved determines the direction and distance the cursor moves on the display. A conventional mouse provides a rigid object that a user can move with great precision. For a desktop computer, the mouse provides a satisfactory solution to the pointing problem. On the occasion when the workspace is not large enough to provide a path over which the mouse can move and accommodate a desired cursor movement on the screen, the user simply picks up the mouse and recenters the mouse in the workspace.

While the mouse has provided a satisfactory solution to the pointing device problem in the desktop PC market, a similarly successful device is not available for hand-held devices such as cellular telephones. These devices lack a sufficiently large flat surface near the keypad or screen over which a mouse can be moved. In addition, the need to carry a separate pointing device makes the mouse less than ideal for these applications. Hence, some other form of pointing device is needed when using these devices.

A pointing device for use in these environments must solve the problem of moving a cursor quickly and accurately. In addition, the device must operate in an intuitive fashion that a novice user can comprehend without extensive instruction. In addition, the pointing device must operate in a limited workspace and fit within the form factor of the hand held device. Finally, the usual constraints of low cost, low power consumption and high reliability must also be met.

In the case of laptop computers, there are two dominant solutions to the pointing device problem in the marketplace, the Synaptics capacitive TouchPad™ and the IBM TrackPoint™. Other companies make versions of these devices with similar functionality. Both of these devices fall far short of satisfying the above requirements. The TrackPoint™ is a small button that is typically placed in the center of the laptop keyboard. The button may be moved in a manner analogous to a "joy stick" by applying a lateral force to the top of the button with a finger. Unfortunately, the button can only move a small amount; hence, the displacement of the button cannot be mapped directly into a displacement in the cursor position on the computer display. Instead, the button displacement controls the direction and speed with which the cursor moves. The accuracy with which a user can position the cursor using this type of velocity control is significantly less than that achieved with a conventional mouse. This limitation is particularly evident in tasks that require small, precise movements such as drawing in a computer graphics program. In addition, this type of pointing device does not provide the button functionality.

The TouchPad™ is a blank rectangular pad, 50 to 100 mm on a side, typically placed below the keyboard of most laptops. The device senses the position of a finger on the surface of the rectangle relative to the edges of the device. This sensing is accomplished by measuring the capacitance changes introduced by a user finger on a series of electrodes beneath an insulating, low-friction material.

Like the TrackPoint™, the TouchPad™ also suffers from lack of precision. It is inherently difficult to measure the capacitive changes introduced by the user, who is at an unknown potential relative to the circuit. Furthermore, the contact area of the user's finger is relatively large. Hence, to provide an accurate measurement of the finger position, the device must determine some parameter such as the center of the contact area between the finger and the pad. Unfortunately, the contact area varies in size and shape with the pressure applied by the user. Therefore, such determinations are, at best, of limited precision. In practice, users are unable to repeatably execute precise movements.

There are also difficulties arising from false signals when the user inadvertently touches the pad with a finger or a wrist. In some devices, the "clicking" function of a conventional mouse is implemented by tapping on the pad. As a result, such inadvertent activation during typing causes the cursor to jump to a new location in the middle of the typing operation and the text being inserted at the new location.

In previously filed U.S. patent application Ser. No. 10/723, 957, which is hereby incorporated by reference, a puck-based pointing device that overcomes many of the problems described above is taught. The pointing device utilizes a puck that moves in a defined field of motion when a user applies pressure to the puck via the user's finger. When the user releases the puck, a set of springs returns the puck to its centered position within the field of motion. The position of the puck and the pressure on the puck are determined by electrodes in the device. The position information is used to position a cursor on the display screen. Software on the attached device translates the motion of the puck during the time the user's finger is pressing on the puck into the appropriate cursor motion on the device's display. When the user releases the puck, the coupling between the puck and the cursor position is broken by the software, and hence, the cursor does not move backwards while the puck is being recentered.

While the device taught in the above-described patent application provides significant advantages over the dominant prior art solutions to the pointing device problem in the laptop marketplace, the device is less than optimum when used with a cell phone or other device with a relatively small screen. On a small screen, the ability to reposition the puck and then continue the motion in a manner analogous to that of mouse on a desktop computer is of limited value, since the amount of information available in the display is relatively limited, and hence, can be adequately accessed by a one-to-one mapping of the puck position to the position of the cursor on the screen.

On the other hand, the limited screen size places a premium on other operations such as scrolling. The small screen of a handheld device such as a cell phone can emulate a small window through which a much larger desktop is viewed. By moving the window in various directions, the desired portion of the desktop can be positioned under the window. Objects on the desktop under the window can then be selected by moving the cursor within the window. Hence, a pointing device for use in such an environment would benefit from having both a pointing function and a two-dimensional scrolling function.

SUMMARY OF THE INVENTION

The present invention includes a pointing device having a movable puck and a display screen. The puck is confined to move on a puck surface having a puck field of motion defined thereon. The puck field of motion is divided into a pointing region and a function region. A controller determines a position for the puck within the field of motion. The display screen displays a two-dimensional scene and a cursor that moves within the scene in a manner controlled by the position of the puck when the puck is in the pointing region. The controller causes the scene to change when the puck is in the function region. In one embodiment, a deformable barrier inhibits the movement of the puck into the function region. The inhibition is overcome by a user applying additional force to the puck in a direction parallel to the surface. In one embodiment, the deformable barrier includes a resilient member disposed between the puck and a non-deformable barrier on the periphery of the field of motion. In one embodiment, the deformable barrier includes a spring.

In one embodiment, the scene represents a view of a portion of a surface as seen through a window movable over the surface. The controller causes the portion of the surface so viewed to change to an adjacent portion of the surface when the puck moves into the function region. The window moves at a speed that depends on the position of the puck in the function region in one embodiment.

DETAILED DESCRIPTION OF THE PREFERRED EMBODIMENTS OF THE INVENTION

Figure 1:
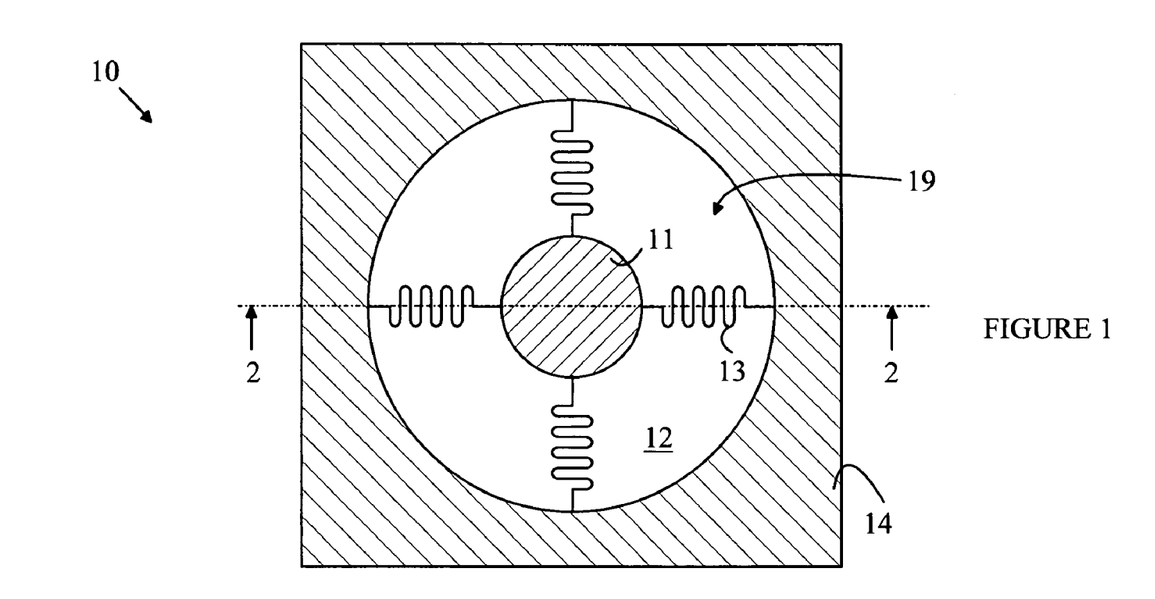
FIG. 1 is a top view of pointing device 10.
Figure 2:
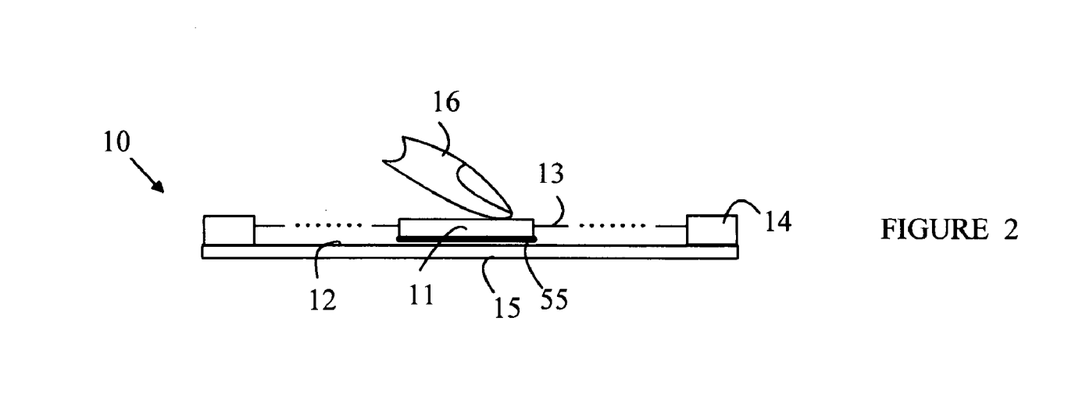
FIG. 2 is a cross-sectional view of pointing device 10 through line 2-2 shown in FIG. 1.

The manner in which the present invention provides its advantages can be more easily understood with reference to FIGS. 1 and 2, which illustrate a pointing device 10 according to one embodiment of the invention taught in the above-described patent application. FIG. 1 is a top view of pointing device 10, and FIG. 2 is a cross-sectional view of pointing device 10 through line 2-2 shown in FIG. 1. Pointing device 10 includes a puck 11 that moves over a surface 12 of a substrate 15 within a puck field of motion 19 in response to a lateral force applied to puck 11. The force is typically applied to puck 11 by a user's finger. Puck 11 includes a pressure sensing mechanism that measures the vertical pressure applied to puck 11. When the sensed pressure exceeds a predetermined threshold, the cursor tracking function is activated and the cursor moves on the screen in a direction and distance determined by the motion of the puck. In addition, pointing device 10 includes a sensing mechanism for determining the position of puck 11 on surface 12.

When the user releases puck 11 by removing the user's finger 16, puck 11 is returned to its centered position by the springs shown at 13 that connect the puck to the side 14 of the puck field of motion. Since the user's finger is not applying a vertical force to puck 11 during its return, the change in position associated with that return motion is not reported to the host device. That is, the cursor remains at its previous location. This provides a convenient "re-centering" capability, typically achieved on a mouse by lifting and replacing the mouse at the center of the field of motion. Re-centering is particularly necessary in laptop computers, hand-held devices and other miniature applications in which the field of motion is constrained.

The above-described patent application teaches a number of mechanisms for measuring the pressure exerted by the user on the puck, and hence, these mechanisms will not be discussed in detail here. For the purposes of this discussion, it is sufficient to note that a puck having a top surface that can move vertically relative to the bottom surface can be utilized. The top surface is held in place by a spring mechanism. When the user applies pressure to the top surface, the top surface moves toward the bottom surface by an amount that depends on the applied pressure. The distance between the top and bottom surfaces of the puck is measured utilizing one of a number of methods. For example, the top and bottom surfaces of the puck can include conducting layers that form a parallel plate capacitor. The capacitance of this capacitor depends on the distance between the plates, and hence, a measurement of the capacitance provides a measurement of the pressure applied by the user.

Figure 3:
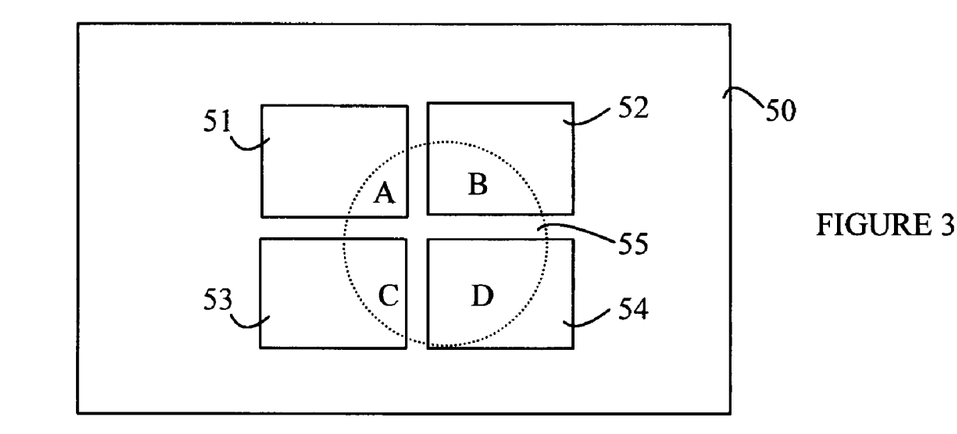
FIG. 3 is a top view of a portion of surface 12 shown in FIG. 1 over which the puck moves in one embodiment of the present invention.

The manner in which the position of the puck is sensed in one embodiment is described in detail in the above-identified patent application, and hence, will not be discussed in detail here. For the purposes of this discussion, it will be assumed that a capacitive sensing scheme can be utilized to determine the puck's position. Such a scheme is illustrated in FIG. 3, which is a top view of a portion of surface 12 shown in FIG. 1 over which the puck moves in one embodiment of the present invention. Surface 50 includes four electrodes shown at 51-54 having terminals that are connected to an external circuit. To simplify the drawing, these terminals have been omitted. The puck has a bottom surface that includes an electrode 55 that is shown in phantom in the drawing. Electrodes 51-55 are electrically isolated from one another. For example, electrode 55 can be covered with a layer of dielectric that provides the required insulation while still allowing electrode 55 to slide over the other electrodes. The electrodes can in fact be patterned on the back of the substrate whose surface is shown at 50. This reduces the capacitance between the electrodes and the puck electrode, but can be practical for substrate thicknesses of a few millimeters or less. The overlap between electrode 55 and each of electrodes 51-54 depends on the position of the puck relative to electrodes 51-54. Denote the overlaps between electrode 55 and electrodes 51-54 by A-D, respectively.

Figure 4:
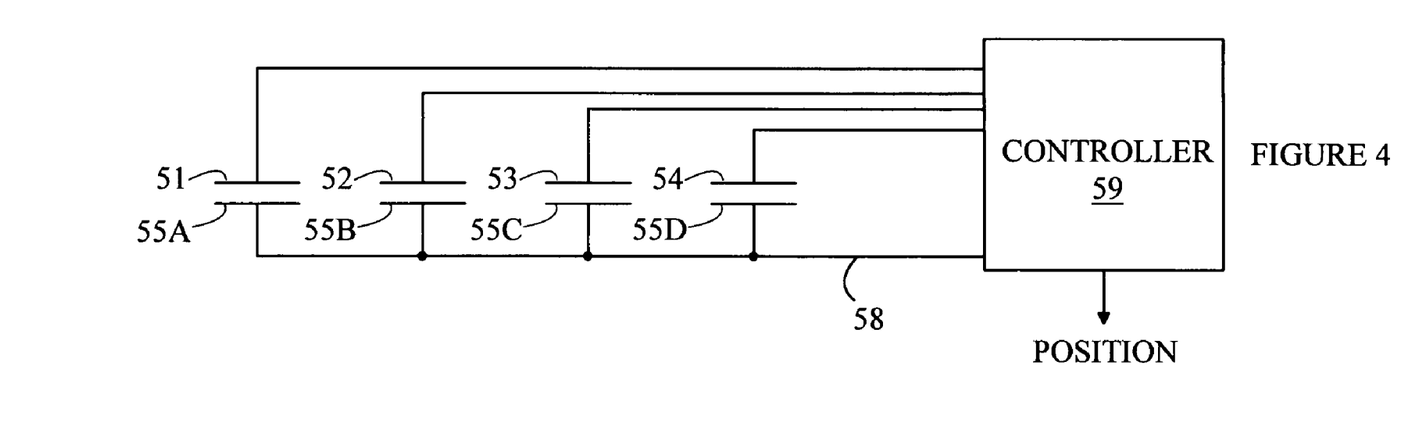
FIG. 4 is a schematic drawing of an equivalent circuit for electrodes 51-55.

Refer now to FIG. 4, which is a schematic drawing of an equivalent circuit for electrodes 51-55. The portion of electrode 55 that overlaps electrode 51 forms a parallel plate capacitor having a capacitance that is proportional to overlap A. Similarly, the portion of electrode 55 that overlaps electrode 52 forms a parallel plate capacitor that has a capacitance that is proportional to overlap B, and so on. Since all of the capacitors share portions of electrode 55, the equivalent circuit consists of four capacitors connected to a common electrode. This electrode is electrode 55. Hence, by measuring the capacitance between electrode 55 and each of electrodes 51-54, the position of electrode 55 relative to electrodes 51-54 can be determined. This determination can be made by a controller 59, which may be part of the pointing device or part of the host device of which the pointing device forms a part.

Figure 5:
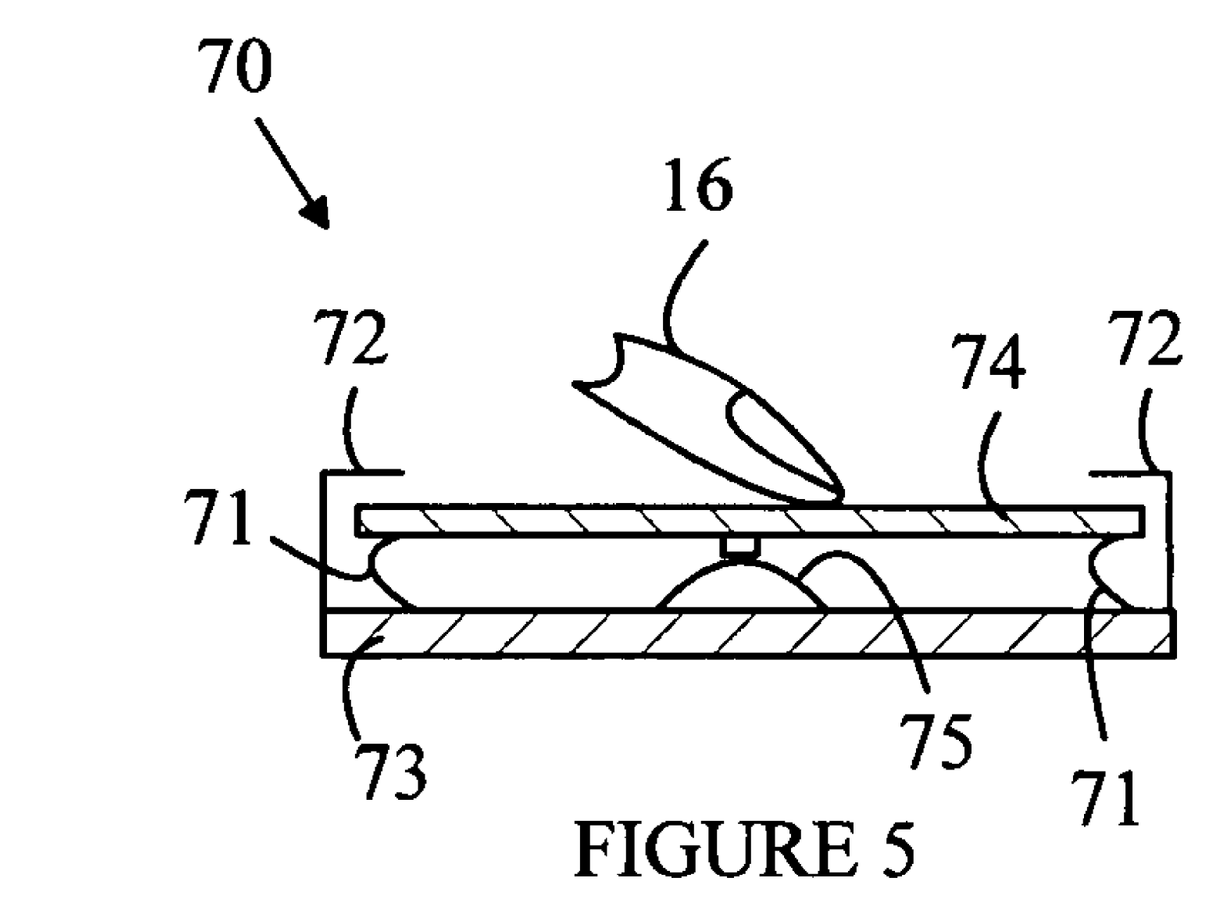
FIG. 5 is a cross-sectional view of a puck 70 that utilizes a dome-shaped clicker that can be incorporated in the puck.

To implement a "click" for selecting an item at the current cursor location, a dome-shaped clicker can be incorporated in the puck. Refer now to FIG. 5, which is a cross-sectional view of a puck 70 that utilizes such a clicker. Puck 70 has a bottom electrode 73 whose capacitance is used to determine the position of the puck in the field of motion as described above. Puck 70 also includes a top electrode 74 that is depressed when the user presses on the electrode. Top electrode 74 is spring mounted to force that electrode against the detents shown at 72 when the user is not pressing on the electrode. In the embodiment shown in FIG. 5, a number of springs 71 provide this function. The distance between electrodes 73 and 74 can be determined by measuring the capacitance between these electrodes. When the user presses lightly on electrode 74, the electrode moves downward until it reaches the top of clicker 75. If the user presses on electrode 74 with a force greater than some threshold force determined by the physical properties of clicker 75 and springs 71, clicker 75 will snap to a configuration in which the dome is inverted. This will relieve the upward force on electrode 74, and electrode 74 will move closer to electrode 75. This new position can be sensed by measuring the capacitance between electrodes 74 and 75.

The clicker shown in FIG. 5 is constructed from a dome-shaped sheet of material that has a height that changes abruptly when the dome is depressed below a predetermined height. The change in states is accompanied by a change in the force applied upward on electrode 74. This provides the user with a sensation like that obtained when a switch is closed. For the purposes of this application, the term "clicker" is defined to include any mechanical device that changes one of its dimensions in response to a force being applied thereto in which the change in dimension is a non-linear function of the applied force. The preferred class of clicker has a bi-stable dimension that switches abruptly between states when the force applied to the clicker is greater than a first threshold force and reverts to its original state when the applied force falls below a second threshold.

Figure 6A:
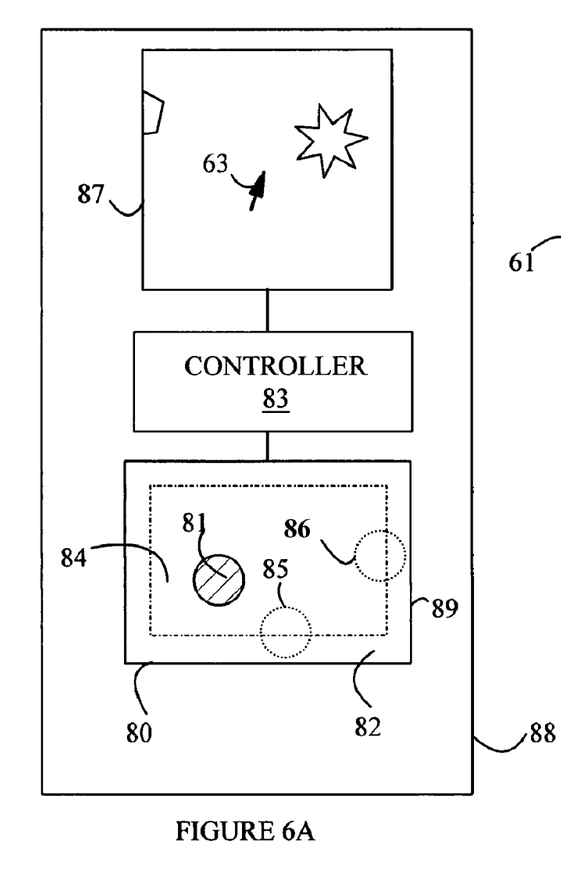
FIG. 6A is schematic drawing of a handheld device according to one embodiment of the present invention.
Figure 6B:
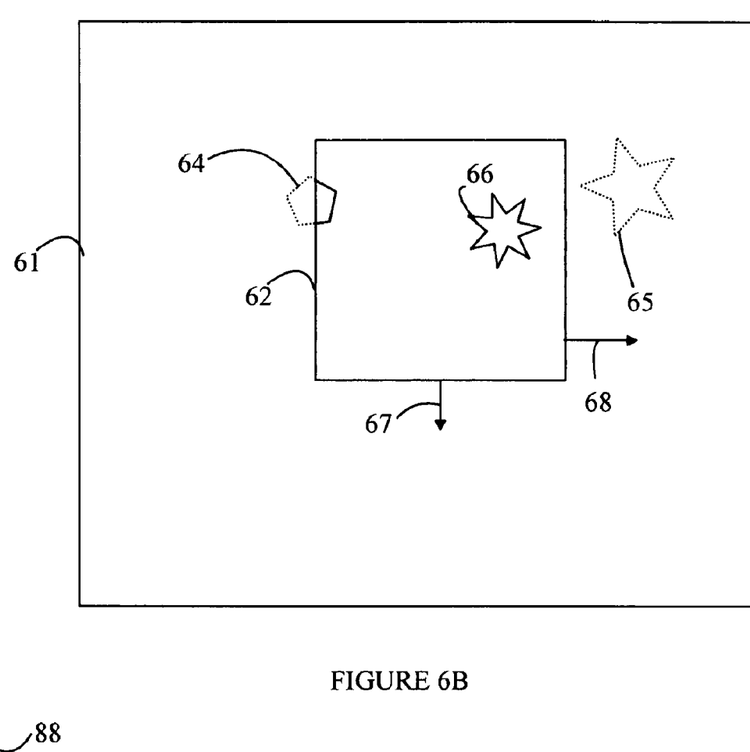
FIG. 6B is a top view of the corresponding desktop and viewing window shown in FIG. 6A.

One embodiment of the present invention can be more easily understood in terms of an analogy in which the contents of a large desktop are accessed through a small viewing window that is positioned over the top of the desktop. Refer now to FIGS. 6A and 6B. FIG. 6A is a schematic drawing of a handheld device 88 according to one embodiment of the present invention. FIG. 6B is a top view of the corresponding desktop 61 and viewing window 62.

Viewing window 62 corresponds to the display on the handheld device. The portion of desktop 61 under viewing window 62 is displayed to the user on the display of the handheld device. In the example shown in FIG. 6B, the desktop contains a number of objects shown at 64-66. Those objects that are under the viewing window can be seen on the display. Hence, the user of handheld device 88 can see object 66 and the portion of object 64 within the viewing window 62 on screen 87 of handheld device 88. However, the user cannot see object 65 unless the user repositions viewing window 62 over object 65.

Handheld device 88 includes a pointing device 80 that operates in a manner analogous to that discussed above with respect to the devices shown in FIGS. 1-5. In particular, pointing device 80 includes a puck 81 that moves within a field of motion 82. The position of puck 81 within field of motion 82 is sensed by controller 83 and used to control both the position of cursor 63 and the position of window 62 within the boundary of desktop 61. It will also be assumed that puck 81 includes a pressure sensing mechanism such as that described above that is monitored by controller 83. When the user engages the pressure mechanism by pressing on puck 81, the controller notes the position of cursor 63 and uses that position to perform a predetermined action, such as selecting the object under the cursor. The pressure mechanism may also include a clicker as described above to provide feedback to the user.

When puck 81 is within region 84 of field of motion 82, the controller moves cursor 63 within view screen 87. The position of cursor 63 within view screen 87 is determined by the position of puck 81 within region 84. Controller 83 includes a one-to-one mapping that specifies the position of cursor 63 for each location of puck 81 in region 84. This mapping is preferably linear.

When the user moves puck 81 to a position outside of region 84, the coupling between the puck position and the position of cursor 63 is broken. In this region, window 62 is caused to move in a direction determined by the position of puck 81. For example, controller 83 can be programmed to implement a scroll function in which window 62 moves in the direction shown at 68 on the desktop when the puck is moved to position 86. In this embodiment, the window will continue to move in this direction until the user moves puck 81 back into region 84. In one embodiment, the window moves at a predetermined constant speed. In another embodiment, the speed is increased as a function of the distance between the puck and wall 89. Similarly, if the puck is moved to position 85, window 62 would move in the direction shown by arrow 67, and so on. A diagonal motion of the window can be implemented when the puck is in the corresponding corner of field of view 82.

Figure 7:
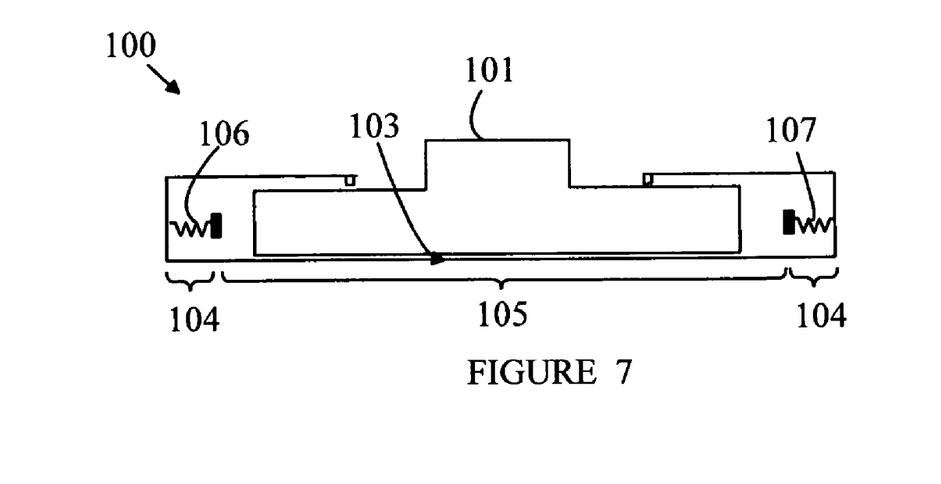
FIG. 7 a cross-sectional view of a pointing device 100 according to one embodiment of the present invention.

Since the functions implemented by the pointing device change abruptly when the puck moves outside of region 84, a mechanism that reduces the probability that the user will change the function inadvertently is desirable. Refer now to FIG. 7, which is a cross-sectional view of a pointing device 100 according to one embodiment of the present invention. Pointing device 100 includes a puck 101 that moves within a field of motion defined by a boundary wall 102. To simplify the drawing, the electrodes that sense the position of the puck over surface 103 have been omitted.

The field of motion is divided into two regions: the region shown at 105 and an annular region shown at 104 surrounding region 105. The area of the field of motion nearest to wall 102 is used for selecting functions such as the scroll operation discussed above. The region 105 in the center of the field of motion is used for the conventional pointing operation in which the cursor is mapped to a location that is determined by the puck position in this area. To prevent the user from inadvertently moving the puck into region 104, a deformable boundary is placed at the junction of regions 104 and 105 as shown schematically by springs 106 and 107. To move the puck into region 104, the user must apply sufficient lateral pressure on puck 101 to compress the springs so that the puck can enter region 104. In normal pointing mode, the lateral force applied by the user to move the puck is much less than that needed to compress the springs, and hence, the user is less likely to switch pointing functions without making a conscious effort.

Figure 8:
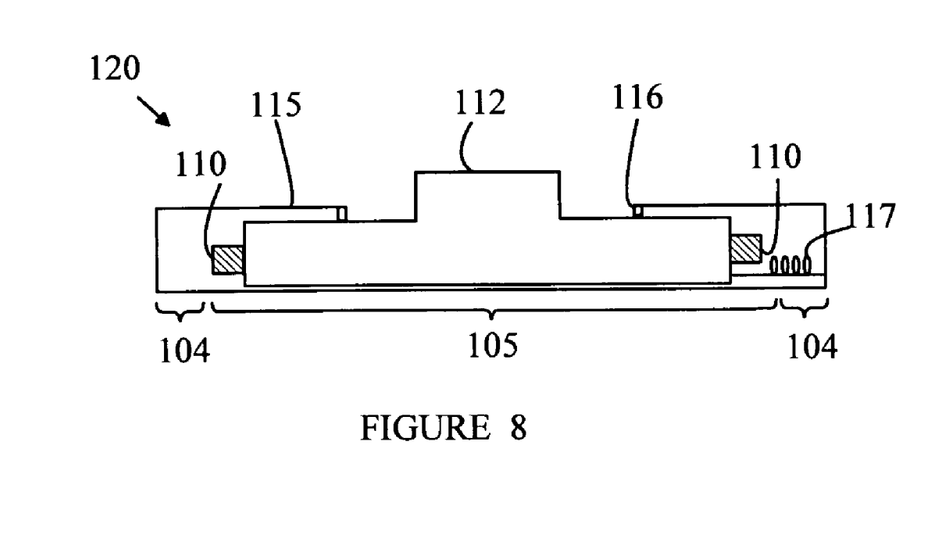
FIG. 8 is a cross-sectional view of pointing device 120 according to another embodiment of the present invention.

While the above-described embodiment utilizes springs attached to wall 102 to change the lateral force that must be applied to the puck to move the puck into region 104, other mechanisms can be utilized. Refer now to FIG. 8, which is a cross-sectional view of pointing device 120 according to another embodiment of the present invention. Puck 112 includes a ring 110 of resilient material such as foam rubber that must be compressed to move the puck into region 104.

The prior art systems discussed above with reference to FIGS. 1 and 2 utilize restoring springs such as spring 13 to recenter the puck when the user takes his or her finger off of the puck. In addition, these springs prevent the puck from leaving the field of motion when the pointing device is turned upside down.

As noted above, this type of prior art pointing device provides an incremental mapping between the puck position and the cursor position that provides fine control of the cursor position on the screen. In contrast to desktop and laptop computers, the screen areas utilized by many handheld devices are relatively small. Accordingly, the accuracy with which the puck is moved in the field of motion is sufficient to provide adequate control of the cursor on the screen. In such embodiments, the restoring springs discussed above with reference to the prior art embodiments shown in FIGS. 1 and 2 are not needed, since the puck position provides a one-to-one mapping with respect to the cursor position on the screen, and hence, the user does not have to recenter the puck to continue moving the cursor across the screen when the puck reaches the boundary of region 105. However, embodiments utilizing restoring springs can still be practiced, as the springs provide a physical feedback to the user as to the position of the puck in the field of motion.

Eliminating the restoring springs reduces the pointing device cost and increases the reliability of the pointing device. Accordingly, embodiments that lack such springs are preferred, provided an alternative mechanism for confining the puck to the field of motion is provided. In addition, embodiments that inhibit debris from entering the field of motion are also desirable, since such debris can inhibit the smooth motion of the puck over the surface of the field of motion. Shroud 115 shown in FIG. 8 and seal ring 116 inhibit debris from entering the field of motion.

In embodiments in which the restoring springs are no longer available to conduct signals to and from the puck, an alternate signal path must be provided. A resilient set of conductors such as cable 117 can be used for this purpose. Alternatively, conducting traces can be provided on the surface of puck 112 that connect to corresponding traces on shroud 115 via an appropriate "wiper". For example, the wiper may be included in sealing ring 116.

In the embodiments discussed above, the field of motion is divided into a pointing region 105 and a function region 104. In the pointing region, the position of the puck determines the position of the cursor on the display screen of the device. When the puck is in the function region, the screen display is scrolled to present other regions of a virtual desktop. However, other functions can be implemented in the function region. For example, specific menus could be displayed on the screen of the handheld device when the puck is moved into one of these regions. The cursor can then be used to make selections from these menus. In principle, any function that alters the material being displayed, as opposed to the cursor position, can be implemented in the function regions.

In the above-described embodiments of the present invention the puck is confined to a rectangular field of motion. However, it is to be understood that the field of motion can have an arbitrary boundary shape. For example, the field of motion can be circular or oval shape.

Various modifications to the present invention will become apparent to those skilled in the art from the foregoing description and accompanying drawings. Accordingly, the present invention is to be limited solely by the scope of the following claims.

What is claimed is:

1. A pointing device, comprising:
   a first surface having a puck field of motion defined thereon, said puck field of motion being divided into a pointing region and a function region;
   a moveable puck that moves on said first surface;
   a controller that determines a position of said puck within said field of motion; and
   a display screen that displays a two-dimensional scene and a cursor that moves within said scene in a manner controlled by said position of said puck when said puck is in said pointing region, wherein said controller causes said scene to change according to a scrolling function when said puck is in said function region;
   a deformable barrier for inhibiting the movement of said puck into said function region, said inhibition being overcome by a user applying a force to said puck in a direction parallel to said first surface.

2. The pointing device of claim 1 wherein said deformable barrier comprises a resilient member disposed between said puck and a non-deformable barrier on the periphery of said field of motion.

3. The pointing device of claim 2 wherein said resilient member is a layer of rubber bonded to a wall of said puck.

4. The pointing device of claim 2 wherein said deformable barrier comprises a spring.

5. The pointing device of claim 1 wherein said scene represents a view of a portion of a surface as seen through a window movable over said surface and wherein said controller causes said portion of said surface so viewed to change to an adjacent portion of said surface.

6. The pointing device of claim 5 wherein said adjacent portion depends on said position of said puck in said function region.

7. The pointing device of claim 5 wherein said window moves at a speed that depends on said position of said puck in said function region.

8. The pointing device of claim 1 wherein said pointing device further comprises a shroud that inhibits the movement of material from outside said field of motion to inside said field of motion.

9. The pointing device of claim 1 wherein the controller is further configured to implement the scrolling function to move a viewing window relative to surface of a graphical desktop and to display a scrolling representation of the graphical desktop on the display screen.

10. The pointing device of claim 9 wherein the controller is further configured to implement a two-dimensional scrolling function when the puck is in a corresponding corner position of the function region of the puck field of motion.

11. The pointing device of claim 9 wherein the controller is further configured to continue to move the viewing window relative to the graphical desktop according to the scrolling function while the puck remains in the function region of the puck field of motion.

12. A method for inputting data to a device having a display screen thereon, said method comprising:
   providing a moveable puck that moves within a field of motion on a surface;
   dividing said field of motion into a pointing region and a function region;
   providing a moveable puck confined to move on said first surface;
   displaying a two-dimensional scene and a cursor that moves within said scene in a manner controlled by said position of said puck when said puck is in said pointing region; and changing said scene according to a scrolling function in response to said puck being moved into said function region;
a different magnitude of force to move said puck in said function region than in said pointing region.

13. The method of claim 12 wherein said scene represents a view of a portion of a surface as seen through a movable window over said surface and wherein said portion of said surface so viewed is changed to an adjacent portion of said surface.

14. The method of claim 13 wherein said adjacent portion depends on said position of said puck in said finction region.

15. The method of claim 13 wherein said window moves at a speed that depends on said position of said puck in said function region.

16. The method of claim 12 further comprising:
moving a viewing window relative to a surface of a graphical desktop according to the scrolling function; and
displaying a scrolling representation of the graphical desktop.

17. The method of claim 16 further comprising implementing a two-dimensional scrolling function when the puck is in a corresponding corner position of the function region of the puck field of motion.

18. The method of claim 16 further comprising continuing to move the viewing window relative to the graphical desktop according to the scrolling function while the puck remains in the function region of the puck field of motion.

\* \* \* \* \*